United States Patent
Bohannon et al.

(10) Patent No.: US 7,103,651 B2
(45) Date of Patent: Sep. 5, 2006

(54) METHOD AND APPARATUS FOR DISCOVERING CLIENT PROXIMITY NETWORK SITES

(75) Inventors: Thomas A. Bohannon, Winder, GA (US); Richard A. Howes, Jr., Roswell, GA (US); James A. Jordan, Roswell, GA (US); Bill Leblanc, Athens, GA (US); Peter A. Tenereillo, Carlsbad, CA (US)

(73) Assignee: Nortel Networks Limited, (CA)

( * ) Notice: Subject to any disclaimer, the term of this patent is extended or adjusted under 35 U.S.C. 154(b) by 770 days.

(21) Appl. No.: 09/728,305

(22) Filed: Nov. 30, 2000

(65) Prior Publication Data

US 2002/0112036 A1     Aug. 15, 2002

(51) Int. Cl.
   *G06F 15/173*    (2006.01)
   *G06F 15/16*     (2006.01)
(52) U.S. Cl. ............... 709/223; 709/232; 709/248
(58) Field of Classification Search ............. 703/238; 709/238, 241, 243, 244, 228, 229, 203, 232, 709/223
   See application file for complete search history.

(56) References Cited

U.S. PATENT DOCUMENTS

| 5,867,706 | A |   | 2/1999 | Martin |
| 6,304,913 | B1 | * | 10/2001 | Rune ........................... 709/241 |
| 6,446,192 | B1 | * | 9/2002 | Narasimhan et al. .......... 712/29 |
| 6,760,775 | B1 | * | 7/2004 | Anerousis et al. ........... 709/238 |
| 2002/0078233 | A1 | * | 6/2002 | Biliris et al. ................. 709/238 |
| 2002/0087725 | A1 | * | 7/2002 | Cummings et al. ......... 709/243 |

FOREIGN PATENT DOCUMENTS

| WO | WO98/18076 A | 4/1998 |
| WO | WO98/53411 A | 11/1998 |

OTHER PUBLICATIONS

Partial European Search Report EP01986029, dated May 25, 2005.
Katz et al, "A Scalable HTTP Server: The NCSA Prototype" Computer Networks and ISDN Systems, No. Holland Publishing, Amsterdam, NL vol. 27, 1994, pp. 155-164, XP00579908 Issn. 0169-7552.
"Introducing Application-Level Replication and Naming Into Today's Web" Proceeding of the International Conference on World Wide Web, May 6, 1996, pp. 1-9, XP002950892.
Baker et al, "Distributed Cooperative Web Servers" May 17, 1999, Computer Networks, Elsevier Science Publishers B.V., Amsterdam, NL pp. 1215-1229, XP004304550, Issn. 1389-1286.

* cited by examiner

*Primary Examiner*—Paul H. Kang
(74) *Attorney, Agent, or Firm*—McGuinness & Manaras LLP

(57) ABSTRACT

A method and a system are described for directing a client to the most optimal, most available Web site or to the most optimal content in a distributed content environment, using an Internet Site Selector, which is an Internet appliance that optimizes the performance of domains hosted on mirrored, geographically distributed Web sites. The system includes various components including the Internet Site Selectors which co-locate with each Web site. The method comprises a number of steps including sending client requests to a primary or main site, redirecting by an Internet Site Selector coupled to the primary or main site the modified client requests to all other participating Internet Site Selectors. Several modes and deployments of the Internet Site Selectors, including geographic site selection, multiple Internet Site Selectors at each Web site, Internet Site Selector grouping, Internet Site Selectors in content routing are described.

4 Claims, 3 Drawing Sheets

METHOD AND APPARATUS FOR DISCOVERING CLIENT PROXIMITY NETWORK SITES

BACKGROUND OF THE INVENTION

1. Technical Field

The invention relates generally to the technology and products widely categorized as Internet Traffic Management (ITM). More particularly, the invention relates to Global Server Load Balancing (GSLB). The method described here is a method and apparatus in various modes for discovering client proximity.

2. Description of the Prior Art

As the Internet has grown and Web access has become mission critical, Web sites have responded to the demand by adding such features as redundancy and load balancing. Accordingly, it has become necessary to direct a client to the geographically closest and least busy Web site. The practice of dispersing data out to the edge of the Internet and closer to the client is widely accepted as beneficial. This practice is useless, however, if client requests are not directed to the data that has been dispersed closest to them.

Current technologies that attempt to provide a measure of geographic distribution of Web requests rely primarily on Domain Name System (DNS) solutions. While they provide some load sharing capabilities, much the same as similar approaches provided before the advent of local server load balancing, DNS solutions have inherent problems that are difficult and resource-intensive to resolve. In addition, DNS solutions are incapable of being content aware and are at best useful in assisting a more robust approach by initially guiding a client to a Web resource.

Using technologies such as service level monitoring and routing hacks, complex proprietary solutions have been created which address some of the above problems. These solutions are typically unique, extremely costly, and vary widely from implementation to implementation.

RELATED ART

A commonly deployed DNS solution that is used to spread client requests across multiple sites is Round Robin DNS. This method works by entering multiple IP address Resource Records to represent a single DNS hostname. As clients resolve the hostname, DNS responds by cycling through the multiple listed IP addresses. This method will distribute client requests across multiple sites but has several limitations:

There is nothing to ensure that the particular Web site is available;
There is no concept of how busy the particular Web site is;
There is no geographical relevance placed on the client's location compared to the Web site's location;
The authoritative DNS server does not consider if the request is being made by a client or by a foreign resolver on its behalf; and
DNS responses may be cached by the client as well as by other DNS servers in the path, thus removing the authoritative DNS server from the decision making process. This removes any fault tolerance capabilities from this solution.

In an attempt to overcome some of the limitations of Round-Robin DNS, another solution has emerged in which the DNS server determines the network distance of each Web site using routing metrics. These metrics are used by the DNS server in an attempt to determine how far away a client is from a Web site, thus allowing the DNS server to answer a DNS request with the Web site address considered closest to the client. The primary DNS server can determine the distance from the client to each Web site by counting network hops; other routing metrics can also be used. This method improves the geographical decision process, but still has several limitations:

There is nothing to ensure that the particular Web site is available;
There is no concept of how busy the Web site is;
An assumption is made that the DNS server can access routing information associated with the client, which is not always true;
The authoritative DNS server does not know if the request is being made by a client or by a foreign resolver on behalf of the client;
The DNS server must make the client proximity decision at DNS resolve time. This decision involves complex routing queries, large table lookups, and even queries to the client. These are time-consuming processes slowing down the response time to resolving the client's DNS query; and
DNS responses may be cached by the client as well as other DNS servers in the path removing the authoritative DNS server from the decision making process.

Yet another common implementation would involve the use of a DNS server in conjunction with routers to approximate network distance to a web site from the requester. This method is achieved through the announcement of a single IP address or a single set of IP addresses throughout the Internet resolving to a single hostname. This method improves the geographical decision process, but still has several limitations:

This solution requires direct or indirect control of routing announcements within an Autonomous System on the Internet, which is not commonly available at this time;
There is nothing to ensure that the particular Web site is available;
There is no concept of how busy the Web site is;
The authoritative DNS server does not know if the request is being made by a client or by a foreign resolver on behalf of the client;

A newer, less common alternative requires geographically distributed DNS servers providing differing IP addresses on a per server basis. This method is achieved through the announcement of a single IP address for authoritative DNS servers, which when queried may each provide a different response specifying the nearest web site. This method also improves the geographical decision process, but still has several limitations:

This solution requires a separate database listing proximity from which each DNS server determines it's response;
Resolving DNS servers or caches may keep out of date responses in cache, sending queries to a less optimal final destination
There is nothing to ensure that the particular Web site is available;
There is no concept of how busy the Web site is;
The authoritative DNS server does not know if the request is being made by a client or by a foreign resolver on behalf of the client;

What is desired is to develop a method for directing the client to the chronometrically optimal, most available Web site or cache.

SUMMARY OF THE INVENTION

The invention provides a process in which a client is directed to the to the chronometrically optimal location for that client. Chronometrically optimal being defined for the purposes of this document, as, 'providing the best overall response time, taking into account all factors which affect response times, including geographical distance, network topology (latency), and server response time'. This is accomplished by a process that determines chronometrically optimal site selection based on the network response time to the client from the participating Web site. According to the invention, by using a synchronization method to instruct each site selector to respond to a client's original request simultaneously, the client is able to first receive the fastest responding Web site's response. These responses must travel over the same network path as the server's data to the client, and therefore provide an accurate representation of what the client's traffic must endure. All the routing metrics, e.g. network congestion and delays, are inherently included, eliminating complicated schemes used in their calculation. If, for any reason, a site is unavailable it does not participate in sending the response to the client and therefore is not chosen as the most optimal site. This solution solves several problems:

If the Web site is in any way unavailable, it can choose not to participate in the response to the client, thus mitigating site congestion. Unavailable sites are avoided with no additional overhead, and the client naturally selects the optimal most available site;

The equipment is co-located with the Web sites and can therefore participate with local load balancers, allowing both site load and availability to be considered;

The client is taken to the most chronometrically optimal site based on response time to the client; and The responses are TCP responses sent to the client. DNS is not involved and thus there are no issues with cached responses to one client being used by another client.

The basis of this solution is that each participating Web site is given a chance to respond to the client's original request, allowing for multiple methods of chronometrically optimal site selection. The most optimal site is determined, either by the appropriate Internet Site Selector responding the fastest in a synchronized 'race', or via a measurement of round trip data transfer time, or via the Client Network Cache (CNC) for the Internet Site Selector knowing itself as the most optimal responder from previously collected measurements.

In the first case, the first response received and processed by the client redirects the client to the Web site that sent the response. An HTTP redirect is then used to redirect a client to a new domain name represented by the Web site's actual servers, or to a URL within the same domain that identifies the responding Web site. (www1.myco.com, vs. www.myco.com/1/)

Redirecting a client to a new domain name locates the optimal, most available Web site to the client. By responding with redirects that send a client to a new domain name represented by the actual Web servers in each individual site, the first HTTP redirect processed by the client browser replaces the relative domain name for the current page with the domain name of the chosen Web site, causing the browser to send requests to the optimal site. Because the client uses this new domain name to resolve any relative references within a Web page, the client is stuck to this optimal site without having to renegotiate this process for each new request.

HTTP redirects that do not direct a client to a new domain, but instead direct the client to a specific URL within the same domain, provide a mechanism through the client in which the distributed Web site optimal to the client can be identified. By having each distributed site prepend a unique identifier to the original URL request, the client requests the URL again from the main site, this time with a unique identifier pre-pended to the request. This unique identifier is then used by the main site selector to select which distributed site should handle the client's requests for distributed data.

The advantages and benefits provided by this method are numerous, for example:

The overall latency experienced by the traffic to and from the client is reduced and thus the unnecessary delay is reduced as well;

The unnecessary traffic generated on backbone networks used to transport this traffic to a distant site is reduced; and The client receives faster responses and has a better experience on the site.

The invention also provides a method to determine, in a distributed environment, which Web cache or file server is optimal for the client. This is accomplished by deploying Internet Site Selectors in content routing. Herein disclosed is a method for directing a client to a specific location based on the content the client is requesting. This enables the Web site administrator to put selected content at distributed servers and caches, and have the site selector direct clients to the appropriate location to retrieve specific content, while keeping the clients on the main Web site for all other content.

The following benefits and others are obtained from this method:

The ability to control what content is served locally and what is pushed out to the network;

The removal of unnecessary bandwidth from the main site since clients get large static content from caches or distributed Web servers;

Pushing data closer to the client gives him a better experience;

Keeping dynamic data fresh at the local site prevents the client from retrieving stale cached data; and The number of cache hits is maximized. The client is only sent to a cache for data that should be cached.

DETAILED DESCRIPTION OF THE INVENTION

A. Internet Site Selector System

A. 1. Topology

Figure 1:
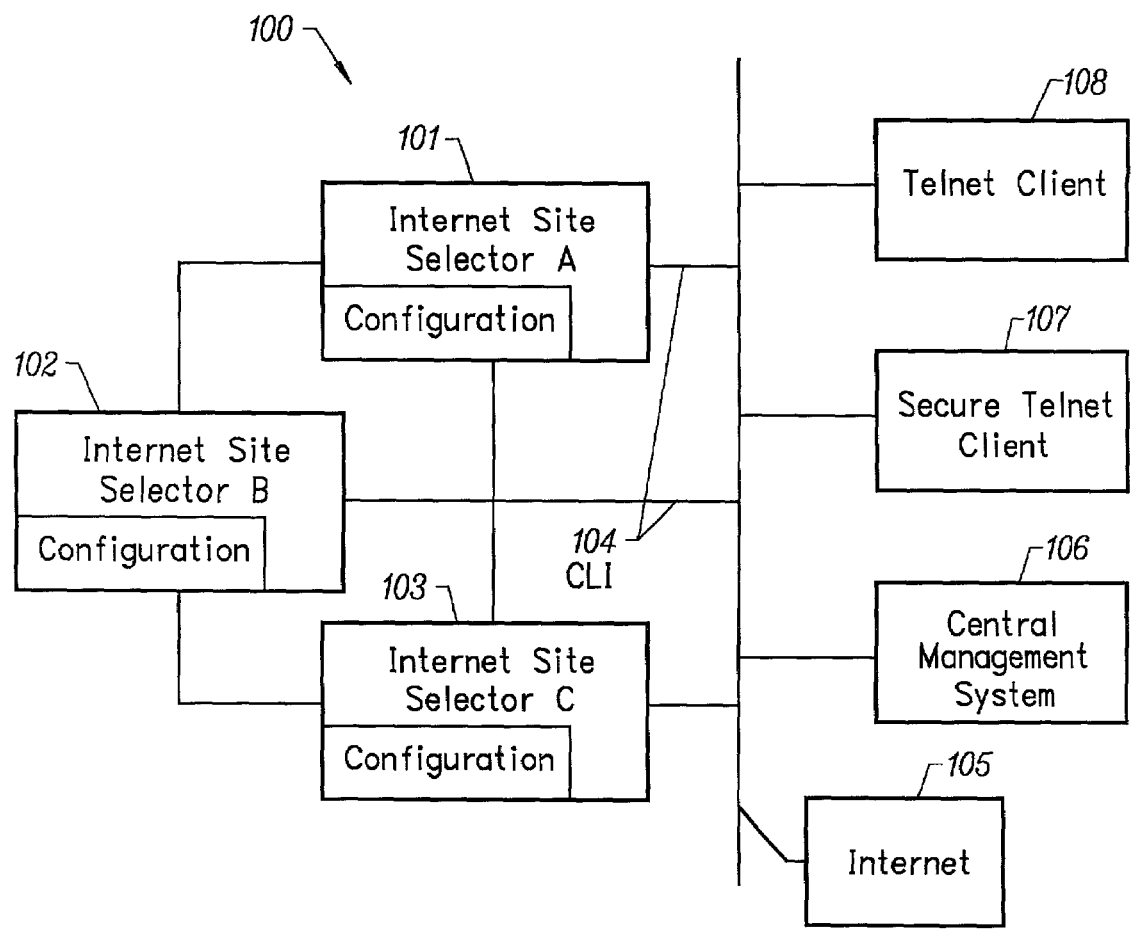
FIG. 1 is a block diagram illustrating an Internet Site Selector (ISS) system according to the invention.

FIG. 1 is a block diagram illustrating an Internet Site Selector system (100), which comprises a set of Internet Site Selectors each with an appropriate configuration (101–103), a set of command line interfaces (104), a centralized management system (106), one or more secure telnet client (107), and one or more Telnet Clients (108). These components communicate to each other with appropriate TCP protocol over the Internet (105).

The Internet Site Selector is an Internet appliance that optimizes the performance of domains hosted on geographically distributed, mirrored Web sites. The Internet Site Selector requires hardware e.g. a Pentium class PC with a sufficient amount CPU memory and processor speed or equivalent devices.

The Internet Site Selector is generally located at each mirror site working in concert to direct client connections to the Web site with the fastest response time to the client. The process ensures the best available Web experience for the client and load-balances traffic across the domain.

A. 2. Operation

The Internet Site Selector (101) interacts with its configuration clients by opening a command line interface port. These configuration clients can be a command line interface (104) or the central management system (106).

The Internet Site Selectors communicate with each other using an MD5 authenticated Internet Site Selector protocol. The protocol between the units is a proprietary protocol running on top of TCP. Each message consists of a message header followed by one or more message components. The message header is used to identify the message type and the version of the protocol used. The message components are used for any data a message may contain.

The message type field in the message header identifies what message it is and implies, but does not restrict the message components that follow. A message type not understood by a receiving unit causes the entire message to be discarded. A message component not understood by a receiving unit is skipped, but the remaining message components continue to be processed. This allows components to be added to a message in later releases without forcing a full protocol version upgrade while retaining backwards compatibility. By maintaining backwards compatibility newer versions of site selector software, which contain advancements resulting in new protocol components, can be installed and still interoperate with existing installations.

The site selector protocol is secured using an MD5 authentication vector. Each site selector is configured with one or more keys used to create a one-way MD5 hash variable included with site selector messages. A security component is added when security is enabled.

To enable protocol security, each site selector is configured with one or more security keys. If a security key is present, each transmitted site selector message contains an MD5 hash of the message plus the key ID in a security component. This security component is the first component following the message header. If more than one key is present, the site selector rotates through the list of keys at configured intervals.

When a site selector receives a message, it verifies the message by computing the MD5 hash using the key identified by the key ID in the message. If security is disabled on a site selector, it ignores this security component. When security is enabled messages are dropped that do not contain a security message key. To facilitate expiring an old key, a site selector discontinues transmitting messages with the key immediately but continues accepting messages using the key for a configured expiration time. This allows a network administrator, or management system, time to synchronize the removal of a key with all site selectors.

The following steps illustrate how the Internet Site Selector A (101) as a client sends a message to the Internet Site Selector B (102) as a server over an MD5 authenticated TCP protocol:

Step 1: Internet Site Selector A (101) constructs a message and a security component;

Step 2: Internet Site Selector A (101) sends the message constructed above to all participating Internet Site Selectors (102, 103);

Step 3: Internet Site Selector B (102) receives the message header and identifies the message type and the version of protocol being used. If the message type is not recognized, the entire message is discarded;

Step 3: Internet Site Selector B (102) receives the security component and verifies the message by computing the MD5 Hash using the key identified in the security component; and Step 4: Internet Site Selector B (102) receives individual message components. Any message component not understood by a receiving unit is skipped, but the remaining message components continue to be processed.

A. 3. Internet Site Selection Modes

The Internet Site Selector provides four site selection modes: FootRace, RelayRace, Refresh, and Image Insert, which are configured by the system administrator.

FootRace, the only non-caching mode, has the least overhead but does not allow the system to learn which local domain had the fastest response to the client. The Internet Site Selector maintains a Client Network Cache (CNC) for all caching modes: RelayRace, Refresh, and Image Insert by recording which local domain had the fastest response to the client.

The Internet Site Selector has two configuration options, i.e., client network cache (CNC) and authoritative Domain Name Server (DNS). For the CNC option, each Internet Site Selector maintains a duplicate CNC of client network addresses associated with client/local domain responses. The Internet Site Selector that receives the initial client request acts as a synchronizing Internet Site Selector. If the synchronizing Internet Site Selector finds an entry in its CNC, it directs the client to the associated Web site, thus avoiding the site selection overhead for that client. The CNC can correlate user data based on DNS name of the client or IP address and compare this data to allow clients that have not established a connection with the Internet Site Selector to benefit from previous client connections.

If no entry is found, however, the synchronizing Internet Site Selector initiates the configured site-selection mode. At the completion of site-selection, each Internet Site Selector exchanges data and updates its own CNC with the new client network/response data. During this site-selection process is a brief period when each CNC may be out of sync.

The cache has two formats. If RelayRace mode is selected, only the IP address of the local domain with the lowest RTT to the client is stored. If Refresh or Image Insert mode is selected, the IP address of each local domain and the associated RTT are stored. The CNC option will not work with FootRace mode because the system never caches which Web site had the fastest response to the client.

Each entry also contains a date-stamp, which allows the deletion of a record older than an administrator-specified limit. The CNC can store static entries for "well-known" networks.

When a client request arrives, the DNS function first queries the CNC (which is required for the DNS option) for client network entries. If no entry is found, the connection is forwarded to the Internet Site Selector in the global domain, which initiates site-selection. If an entry is found, the client gets the list of local domain IP addresses with the IP address of the fastest site. For this option to work, the client must be on the same network as the DNS resolver.

In an Internet Site Selector system, the multiple distributed web sites appear to be a single domain. The Internet Site Selector treats this to be a global domain, which consists of multiple "real" web sites referred to as local domains Each web site is registered in DNS with a unique URL. To participate in the site selection process, an Internet Site Selector must be configured as a member of that local domain. An Internet Site Selector network can have more than one global domain; a mirror Web site can support more than one local domain; and an Internet Site Selector can be a member of more than one local domain.

The general steps for site selection process include:

Step 1. A client requests a resource from a domain.

Step 2. DNS resolves the domain name to the IP address of one of the Internet Site Selectors in a global domain.

Step 3. The Internet Site Selector, which receives the client's initial request and acts as a synchronizing Internet Site Selector, synchronizes the site selection process through a separate TCP/IP connection with other Internet Site Selectors.

Step 4. At the conclusion of site selection, the client is redirected to the site with fastest response time to the client.

When the synchronizing Internet Site Selector receives the initial client request, it first determines which site selection mode has been selected. If RelayRace, Refresh or Image Insert mode is selected, the client network cache (CNC) is enabled. If FootRace is selected, the CNC is disabled because the Internet Site Selectors never cache which local domain had the best response to the client.

Footrace Mode

The following steps illustrate the operation of this mode:

Step 1. A client establishes the initial set of TCP connections to a Web site and eventually sends an HTTP GET request for a resource from a global domain to an Internet Site Selector coupled to the web site. DNS resolves the domain name to the IP address of one of the Internet Site Selectors in a global domain. The global domain is registered in DNS with a unique URL.

Step. 2. The Internet Site Selector, which receives the client's initial request acts as a synchronizing Internet Site Selector and sends a pre-built redirect message to each and every participating Internet Site Selector, including itself. The message contains its local domain URL in the domain portion of the message. The local domain URL refers to the DNS-registered URL for a redundant Web site in a global domain.

Step. 3. Each and every participating Internet Site Selector overwrites the domain portion with its own local domain URL and sends the message to the client at the precise time specified by the synchronizing Internet Site Selector.

Step. 4. The client integrates the first redirect message it receives into the TCP stream and finishes the session with the synchronizing Internet Site Selector. The client, following the redirect, then initiates a new TCP connection to Web site of the Local Domain that sent. The first redirect message herein refers to the message that travels the fastest path.

RelayRace Mode

RelayRace mode uses the same proximity method as footrace mode, but unlike footrace mode, allows the use of the CNC. The following steps illustrate the operation of this mode:

Step 1. A client establishes TCP connection to a first Web site and sends HTTP GET request for a resource from a global domain to an Internet Site Selector coupled to the first web site. DNS resolves the domain name to the IP address of one of the Internet Site Selectors in the global domain.

Step 2. The synchronizing Internet Site Selector sends a pre-built Redirect message to every member site selector, including itself. The message contains the global domain URL in the domain portion of the message. Here the global domain URL refers to the DNS-registered URL for the site selectors.

Step 3: Each Internet Site Selector inserts its local domain ID into the resource path and sends the message to the client at the precise time specified by the synchronizing Internet Site Selector.

Step 4. The client integrates the first redirect message it into the TCP stream and sends a GET to the Global Domain URL. The first redirect message herein refers to the message that travels the fastest path.

Step 5. The synchronizing Internet Site Selector recognizes the local domain ID and redirects the client to the corresponding local domain URL. The client finishes the session with that Web site.

Step 6. The synchronizing Internet Site Selector sends the new client network data to the other Internet Site Selectors and each Internet Site Selector updates its Client Network Cache (CNC).

Refresh Mode

The following steps illustrate the operation of this mode:

Step 1. A client establishes TCP connections to a first Web site and sends a HTTP GET request for a resource from a global domain to an Internet Site Selector coupled to the first web site. DNS resolves the domain name to the IP address of one of the Internet Site Selectors in the global domain.

Step 2. The Internet Site Selector that receives the client's initial request acts as a synchronizing Internet Site Selector. This synchronizing Internet Site Selector builds an HTML page with links to each member of a group of participating Internet Site Selectors. The page also includes a META refresh tag that later executes an HTML refresh command, causing the client to later send an HTTP GET request to the initially queried Internet Site Selector.

Step 2a. The synchronizing Internet Site Selector sends the portion of the HTML page up to, but not including, the META tag. This prevents the browser from executing the refresh before the requests for the links are complete.

Step 3. The client requests the objects from the Internet site selectors specified in the HTML page returned to it in the previous step. This allows for a measurement of the RTT (Round Trip Time) to the client from each participating Internet Site Selector.

Step 4. Each participating Internet Site Selector responds to the client request, measuring the RTT between itself and the client during TCP handshaking.

Step 5. The participating Internet Site Selector(s) send the RTT data back to the synchronizing Internet Site Selector over inter-box protocol (IBP). The synchronizing Internet Site Selector updates its Client Network Cache (CNC) with the new RTT data.

Step 5a. Once the synchronizing site selector receives the first update to the CNC, the META Refresh tag is sent to the client. (The assumption is that additional updates to the CNC that represent well-performing candidate sites will be received shortly thereafter).

Step 6. Once the client has received the HTML refresh command, it makes an HTTP request to the synchronizing Internet Site Selector.

Step 7. The synchronizing Internet Site Selector receives the client request. Using the collected CNC response data for the client for each participating Internet Site Selector, it selects the local domain with the lowest RTT. It then responds to the client's HTTP GET request with an HTTP redirect to the local domain with the lowest RTT. The client finishes the session with that site.

Step 8. The synchronizing Internet Site Selector sends the new client network data to the other site selectors and each site selector updates its CNC.

Image Insert Mode

The following steps illustrate the operation of this mode:

Step 1. A client establishes TCP connection to a first Web site and sends an HTTP GET request for a resource from a global domain to an Internet Site Selector coupled to the first web site. DNS resolves the domain name to the IP address of one of the Internet Site Selectors in the global domain.

Step 2. The Internet Site Selector, which receives the client's initial request and acts as a synchronizing Internet Site Selector, proxies the connection to the origin server, and responds with requested content. It also inserts image links to other participating Internet Site Selectors.

Step 3. The client follows these links to these other participating Internet Site Selectors, allowing them to determine Round Trip Times (RTT) to the client. These times are then reported back to the synchronizing Internet Site Selector over inter-box protocol (IBP).

Step 4. The participating Internet Site Selectors for the global domain then cache the network address of the client. Upon the next request from the client or client network, the client is directed to the optimal site through either DNS or HTTP redirect.

B. Chronometric Site Selection

B. 1. Topology

Figure 2:
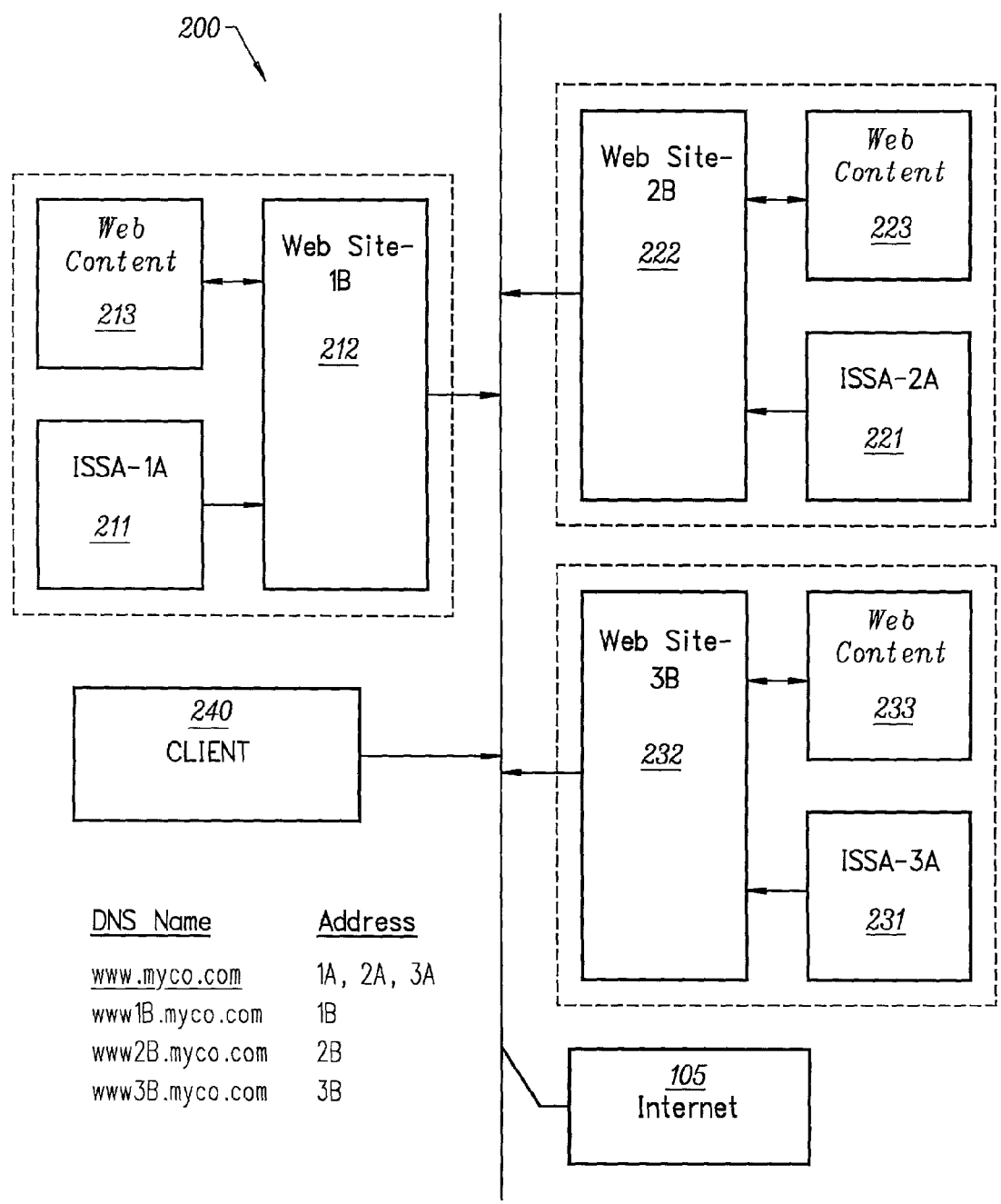
FIG. 2 is a block diagram illustrating a system wherein the Internet Site Selectors (ISS) are deployed at each geographically dispersed Web site with the IP address of the site selectors entered in DNS as the addresses for the Web site domain according to the invention.

FIG. 2 is a block diagram illustrating a system (200) wherein Internet Site Selectors are deployed at each geographically dispersed Web site with the IP address of the Internet Site Selectors entered in DNS as the addresses for the Web site domain, e.g. www.myco.com would resolve to each Internet Site Selector address, according to the invention. In this scheme, each Web site is registered in DNS with a unique name. An Internet Site Selector (211) is co-located with each Web site and is configured to redirect clients to the unique domain name of the Web site. These Internet Site Selectors, 1A (211), 2A (221), and 3A (231), may participate in an Internet Site Selector system (100) and have properties configured through a command line interface or the centralized management system (106). Table 1 shows the DNS configuration for this system.

TABLE 1

Internet Site Selector DNS Entries

| DNS Name | Participants |
|---|---|
| www.myco.com | 1A, 2A, 3A |
| www1B.myco.com | 1B |
| www2B.myco.com | 2B |
| www3B.myco.com | 3B |

B. 2. Operation

The following steps describes traffic flow when the Internet Site Selectors (211, 221, 231) are deployed and a client (240) from the Internet initiates a www.myco.com connection:

Step 1: Each Internet Site Selector joins the configured group(s) by opening a TCP connection to each group member for which a TCP connection does not already exist. They then execute a synchronization process with each other;

Step 2: A client (240) attempts to resolve the host name for www.myco.com. DNS responds with one of the Internet Site Selector's IP addresses (1A, 2A, or 3A). For description purpose, we assume that for whatever reason, address 2A (221) in FIG. 2 above is selected;

Step 3: Using this address, the client (240) initiates a TCP connection to the corresponding Internet Site Selector 2A (221). The Internet Site Selector 2A (221) completes the TCP handshake and receives the HTTP request from the client (240);

Step 4: Using the HTTP request, the Internet Site Selector 2A (221) maps the fully qualified domain name to a participating group. It then builds the appropriate HTTP response and tunnels this response to all other members in the group (1A and 3A above). Other information is included with this HTTP response, such as the original URL request and synchronization information. The response itself is an HTTP redirect;

Step 5: Each group member receives this message and modifies the HTTP redirect as appropriate to refer to the domain name being represented by the co-located Web site. In current embodiment, 1A (211) uses the 1B (212) domain and 3A (231) uses the 3B (232) domain, e.g. www1B.myco.com and www3B.myco.com, respectively. Based on the synchronization information, each Internet Site Selector, including 2A (221), initiates the HTTP redirect response to the client as if it were the original Internet Site Selector. The use of synchronization information ensures that all Internet Site Selectors initiate the response at the same time;

Step 6: The client (240) receives each HTTP redirect response. Only the first response is assembled into the TCP stream. The client (240) is then redirected to the Web site that responded to the client first (the optimal site). In current process, 1A (211) is the selected site because it is optimal in time to the client and the site is available; and Step 7: All subsequent relative requests made by the client (240) go directly to the same Web site (1A) based on their association to the Web site's fully qualified domain name.

An important aspect of this invention is the ability to synchronize the responses sent by each Web site's Internet Site Selector. This is accomplished using a proprietary time resolution protocol. Using a TCP connection between each unit, the units share their time clocks and round trip times (RTT) with each other. The RTT and clock convergence algorithm is an adaptive process that continuously updates over this TCP connection based on the rate of change experienced in measuring RTT times.

The site that receives the client's initial request acts as the synchronizing site and forwards a pre-built response to all other participating site selectors. This response is a HTTP redirect for the originally requested URL, but redirects the client to the domain of the virtual address in a load balanced site, i.e. the 'B' address in FIG. 2, or the domain of a Web server's real address. This response, including the full IP Header, TCP Header, and HTTP data, is tunneled via the site selector protocol to every other site selector along with the exact time the receiving site selector sends this message.

Each receiving site in turn alters the domain specific portion of the redirect message to redirect the client to the site they each represent. Then, simultaneously, each site initiates the HTTP redirect response to the client as if it where the original site. The client's TCP stack accepts the HTTP redirect it receives first and discards any later packets, considering them to be retransmissions. Given that the optimal site gets this redirect to the client the fastest, the client is redirected to the optimal site. From this point forward, all relative URLs followed by the client take the client to this desired site.

When building this HTTP redirect response the original site must ensure that the client (240) processes the multiple responses correctly. This means the actual response sent by each Internet Site Selector must use a unique ID number in the IP header, identical sequence numbers in the TCP header, and an identical message length. Varying IP ID numbers prevent the client from reassembling any fragmented packets from one Internet Site Selector's response into another Internet Site Selector's response. Identical TCP sequence numbers and message length ensure that the client's TCP stack accepts and assembles the data from each Internet Site Selector as it is received. To ensure this behavior, the original site includes the IP, TCP, and HTTP portions of the response forwarded to each Internet Site Selector.

The HTTP portion of the response includes a pad field that allows each receiving Internet Site Selector to over-write the domain information with its own value, which may be a different length than the original. By including sufficient padding in the original response, each unit expands or contracts the length of the domain information by adding or deleting pad bytes to avoid changing the overall length of the response.

Table 2 shows an HTTP redirect using the pad variable for the padding.

TABLE 2

HTTP Redirect

| HTTP Header | Contents |
| --- | --- |
| Status Line | HTTP/1.1 307 (for version 1.1 clients) |
| | HTTP/1.0 302 (for version 1.0 clients) |
| General Header | Cache-Control: Private |
| | Connection: Close |
| | Date: <GMT Date> |
| Response Header | Server: <name of this Internet Site Selector> |
| | Pad: <pad characters> |
| | Location: HTTP://www2B.myco.com/original_url |
| | Expires: <GMT + configurable time> |
| | Content-Length: x |
| | Content-Type: text/html |

The receiving Internet Site Selector matches the 'www2B.myco.com/' portion of the Location field and determines from its configuration that this is what must be overwritten with the domain it has been configured to place in its redirect message to the client. Starting with the '/', this Internet Site Selector writes backwards and replaces 'Location: HTTP://www2B.myco.com' with 'Location: HTTP://www1B.myco.com'. It is important to note here that if site 1B desires to prepend this URL with a different directory structure it can do so at this point. For example, site 1B may wish to start its directory structure with '/static'. This is accomplished by overwriting the location field with 'Location: HTTP://www1B.myco.com/static/' prepended to the original URL. Due to the fact that the new string length is longer than the original, it overwrites some of the pad characters. After changing the domain specific information in the HTTP portion of the pre-built response, the Internet Site Selector sets its outgoing buffer pointer to the beginning of the IP header included in this message. Because the original Internet Site Selector has already included the entire IP, TCP, and HTTP headers, the receiving Internet Site Selector sends the datagram directly as it is. All Layer 3 and 4 information, with the exception of an adjustment to the TCP checksum, is present and must be left untouched.

When directing a client to the optimal site, it is beneficial to include the site's performance as a factor in ensuring that a client gets to the optimal and most available site. As Web site load increases, there is a natural effect of network degradation affecting Internet Site Selector response times that results in a decreasing possibility of this site being optimal and most available. Due to this, there is a characteristic leveling of Web site load. If Web site performance degrades faster than network degradation, however, the Internet Site Selector avoids attracting new clients by enhancing this natural tendency. Based on measured Web site performance dropping below configured thresholds, an Internet Site Selector alters its participation in sending the HTTP redirect messages to clients by delaying its responses by a configurable factor of time. As the performance value becomes worse, the delay placed on sending responses increases in an attempt to allow other Internet Site Selector sites to be selected. This technique naturally benefits overall site performance and still guarantees the best response to the client. Once the determined load drops to an acceptable threshold, the Internet Site Selector resumes normal operations. Only in the event of a site failure, does the Internet Site Selector not participate in redirecting clients at all. The Internet Site Selector determines Web site loads by active probing or by participating in proprietary protocols, such as Alteon WebSystem's distributed site state protocol (DSSP) when monitoring the health of a Web site.

C. Placing Multiple Internet Site Selectors at each Web Site

In the Internet Site Selector deployment described so far, a single Internet Site Selector is present at each Web site. To provide fault redundancy and scalability, multiple Internet Site Selectors are placed at each Web site. A local load balancer is used to distribute load across these units. The introduction of multiple Internet Site Selectors at each site can be viewed from the perspective of the client and from the perspective of the system.

Providing Internet Site Selector redundancy and scalability at a single site from the perspective of the client is accomplished using traditional load balancing. A virtual address used to represent a cluster of Internet Site Selectors is entered in DNS as one of the addresses for the system. Clients connect to the virtual address using TCP, and the load balancer evenly distributes these connections across the multiple Internet Site Selectors. An additional benefit of using multiple Internet Site Selectors at a Web site is the added level of fault tolerance gained by the system in the event that one or more Internet Site Selectors become unavailable.

Load balancing Internet Site Selectors can be used to the advantage of the system as well. In the setup described earlier, a single Internet Site Selector is present at each Web site, and all Internet Site Selectors in the same group make TCP connections to each other. This connection is used to forward the HTTP redirects to each site where they are modified and forwarded to the client. When multiple Internet Site Selectors are present at a single site, a full mesh of TCP connections between each Internet Site Selector is not necessary.

As a client establishes a connection to a Web site virtual address, the client is load balanced to the most available Internet Site Selector, which initiates the process to redirect the client. In the non-load balanced scenario, this sequence proceeds as the original Internet Site Selector forwards the HTTP redirect response to every other Internet Site Selector in the group, which in turn modify and forward the redirect to the client. In the load balanced case, however, there is no reason for all Internet Site Selectors at each site to participate in this process, because any one of them are capable of the task. In fact, a TCP connection from every Internet Site Selector to every other Internet Site Selector results in maintaining unnecessary TCP connections for each Internet Site Selector. This also causes an unnecessary and potentially large number of redirects to be sent to the client. This solution lacks scalability both for the Internet Site Selectors and for the client. The original Internet Site Selector however, must have a mechanism to ensure that each site participates in determining which site is optimal to the client.

To satisfy this requirement, each Internet Site Selector has a connection with at least one Internet Site Selector at each Web site. In a load-balanced system, this is achieved by each Internet Site Selector maintaining a connection to or from a virtual Internet Site Selector address of every other site. To guarantee that an Internet Site Selector has a valid connection with at least one Internet Site Selector at each location, the Internet Site Selectors are configured with both the virtual address of each location and with the virtual address of their own location. When a connection is made between two Internet Site Selectors, they each identify themselves and which location they represent. As long as each Internet Site Selector has either a connection to the Virtual Address of each Web site or a connection from a participating Internet Site Selector from each Web site, full coverage is obtained with a minimum of connections. If a TCP connection from another site ever fails, the Internet Site Selector re-establishes the connection to the virtual address representing the Internet Site Selectors at that Web site. This provides a level of fault protection from one site to another as well.

In the event that an Internet Site Selector has multiple connections with a single site, it load shares the use of these connections with each HTTP redirect message sent to that site. This distributes the load across the multiple Internet Site Selectors at that site.

D. Internet Site Selector Grouping

D. 1. Topology

Figure 3:
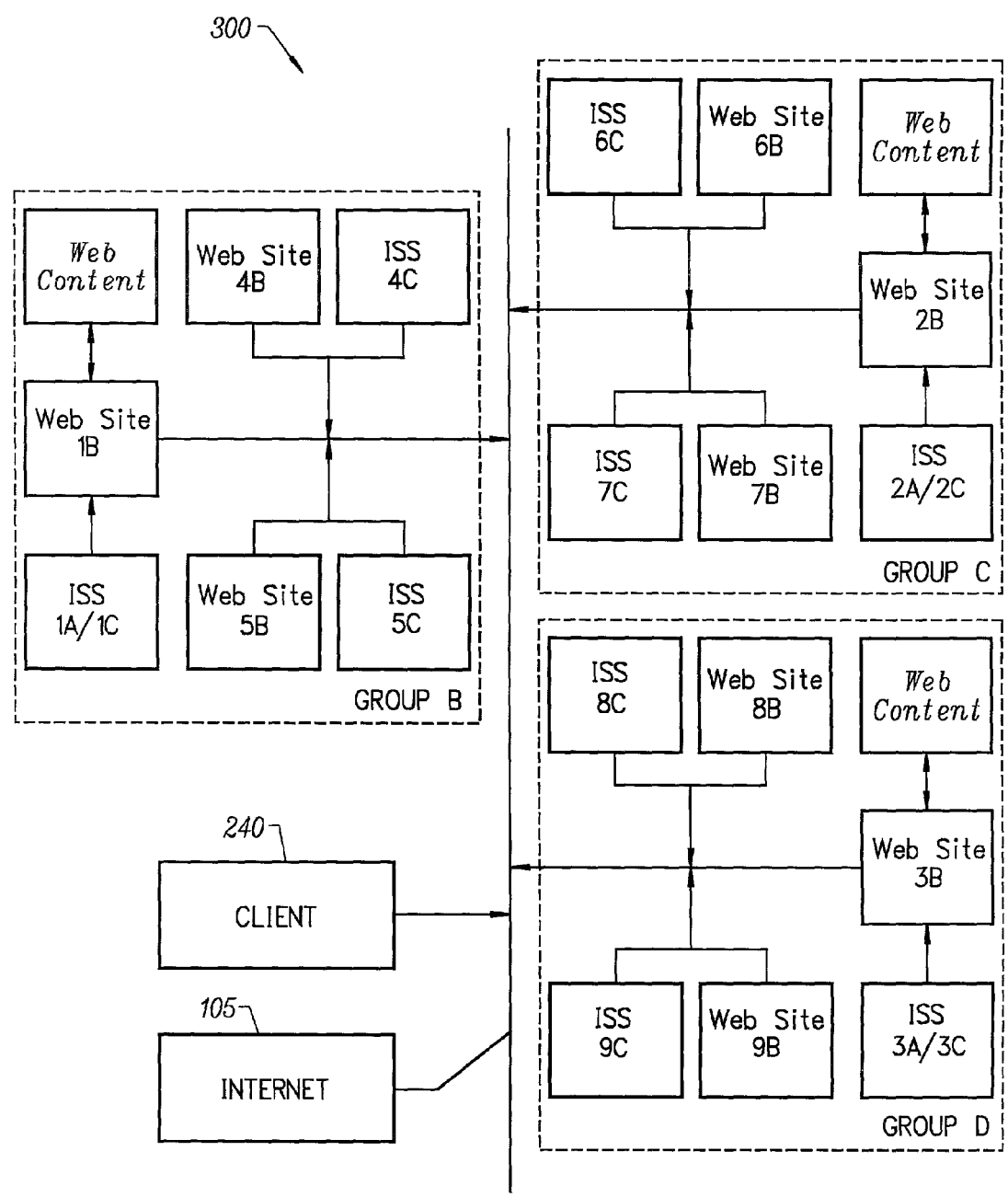
FIG. 3 is a block diagram illustrating a system comprising three main Web sites, wherein multiple groups with each Internet Site Selector (ISS) participating in one or more groups simultaneously according to the invention.

FIG. 3 is a block diagram illustrating a system 300 comprising three main Web sites referred to as 1, 2, and 3, wherein multiple groups with each Internet Site Selector participating in one or more groups simultaneously. Groups of Internet Site Selectors are the actual units that participate in determining which site is closer to the client. When referring to the sites herein, the term fully qualified domain name (FQDN) means the individual units who's addresses are entered in DNS. Assume that each site is in a different region of the world. For example, these could be the US, Europe, and Australia. Along with each site there is a scattering of smaller Web sites and/or caches associated to the main site in general proximity. In this embodiment, the goals are to first get a client (240) to the optimal main site and then get the client to the optimal Web site. These are accomplished in a two-stage process by dividing the large group of the Internet Site Selectors in FIG. 3 into smaller groups.

In current embodiment, group A consists of the main Internet Site Selectors 1A, 2A, and 3A, as in the previous embodiment. These sites do not send redirects to the actual server's FQDN ('B' label in the diagram) but now instead send them back to themselves using the 'C' FQDN. This is actually another FQDN on the same Internet Site Selector. In addition to this main group, there are three more groups. Table 3 shows how these groups are arranged and how the redirection process occurs.

TABLE 3

Internet Site Selector DNS Entries

| Group | Members | Redirect Location |
| --- | --- | --- |
| A | 1A, 2A, 3A | Co-located C FQDN |
| B | 1C, 4C, 5C | Co-located B FQDN |
| C | 2C, 6C, 7C | Co-located B FQDN |
| D | 3C, 8C, 9C | Co-located B FQDN |

D. 2. Operation

The following steps describes how the system responds to a client request:

Step 1: The main sites each compete to see which is the most optimal site for the client as in the previous embodiment, except in what is put into the HTTP redirect. The client is redirected back to another FQDN on the same Internet Site Selector. The Internet Site Selector is capable of representing multiple FQDNs. Using multiple FQDNs provide a method to distinguish for which group a request is given. This FQDN on that Internet Site Selector participates in another group that consists of only Internet Site Selectors in that geographic region; and Step 2: This group now repeats the sequence of events as in previous embodiment to determine which of these sites is most optimal for the client. The HTTP redirect responses sent by the sites in this group redirect the client to the actual server (or cache) associated with each Internet Site Selector.

To summarize, by dividing the large group of Internet Site Selectors, the client is first directed to the optimal main site and then to the optimal Web site in that region in the above described two-stage process.

The distinct features of this embodiment include, but are not limited to:

The size of each group, and thus the number of competing redirects, is kept to a minimum;

Because the size of each group is kept small, it is easier to manage;

It provides a logical hierarchy and is thus easier to understand; and

Fewer redirects are received and discarded by the client.

Thus, the invention allows a distributed knowledge of how each group is arranged, making it easier for one site to add or delete associated sites without affecting the configuration of other sites.

Accordingly, the invention should only be limited by the claims included below.

The invention claimed is:

1. A computer network, comprising:

a plurality of network appliances that optimize the performance of domains hosted on geographically distributed, mirrored network sites;

a client computer coupled to said plurality of network appliances; and a network over which said network appliances and said client computer communicate;

wherein, in response to a connection request by the client to a mirrored network site, each network appliance associated with each mirrored network site issues a response to the connection request to allow the client to connect to a mirrored network sites having an the optimal response time to said connection request, wherein each mirrored network site selectively delays their respective response in accordance with a load of the associated mirrored network site.

2. The computer network of claim 1, wherein said network appliances communicate with each other through an authenticated protocol on top of a communications protocol.

3. The computer network of claim 1, wherein at least one of said network appliances communicates with said client computer through a TCP protocol.

4. The computer network of claim 1, wherein said client computer runs a secure or insecure Telnet session to display or modify the configuration of said network appliances.

* * * * *